No. 804,088. PATENTED NOV. 7, 1905.
M. H. BLAKESLEE.
PNEUMATIC TIRE.
APPLICATION FILED DEC. 1, 1904.
2 SHEETS—SHEET 1.
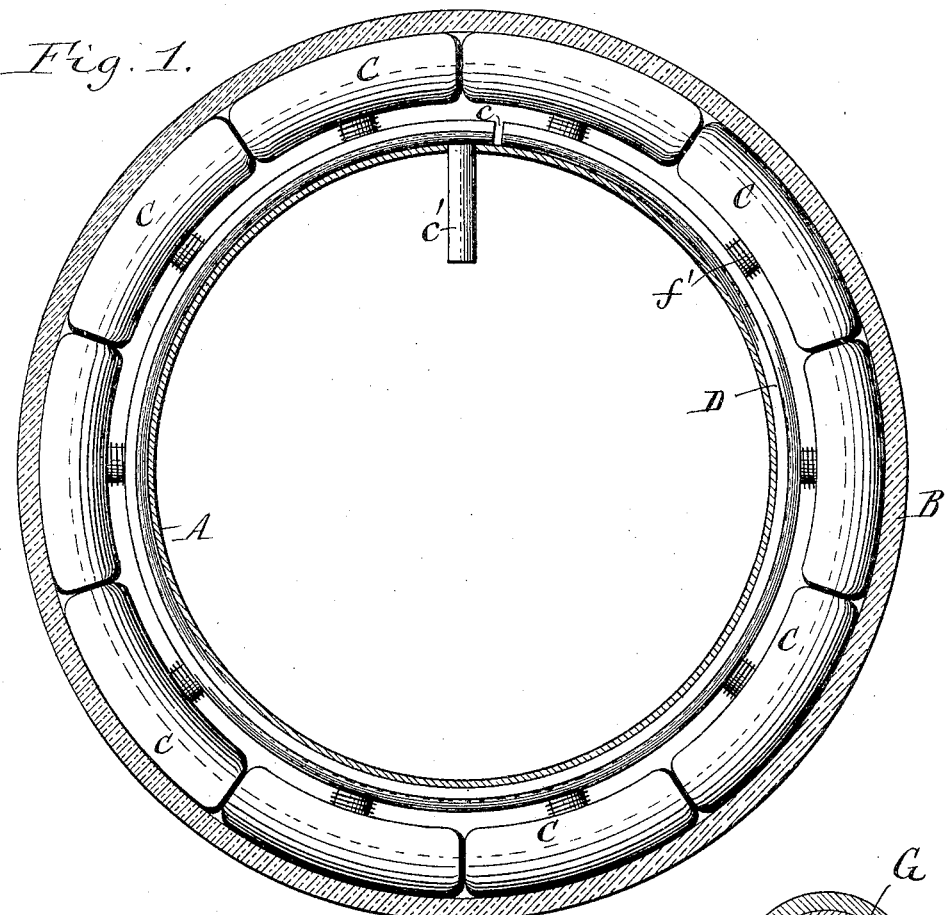
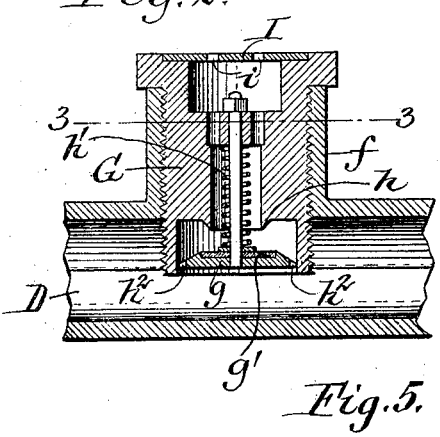
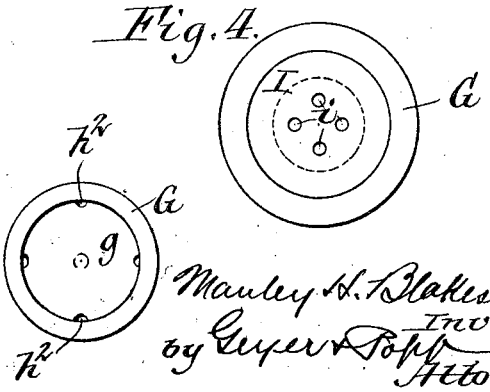

No. 804,088. PATENTED NOV. 7, 1905.
M. H. BLAKESLEE.
PNEUMATIC TIRE.
APPLICATION FILED DEC. 1, 1904.
2 SHEETS—SHEET 2.
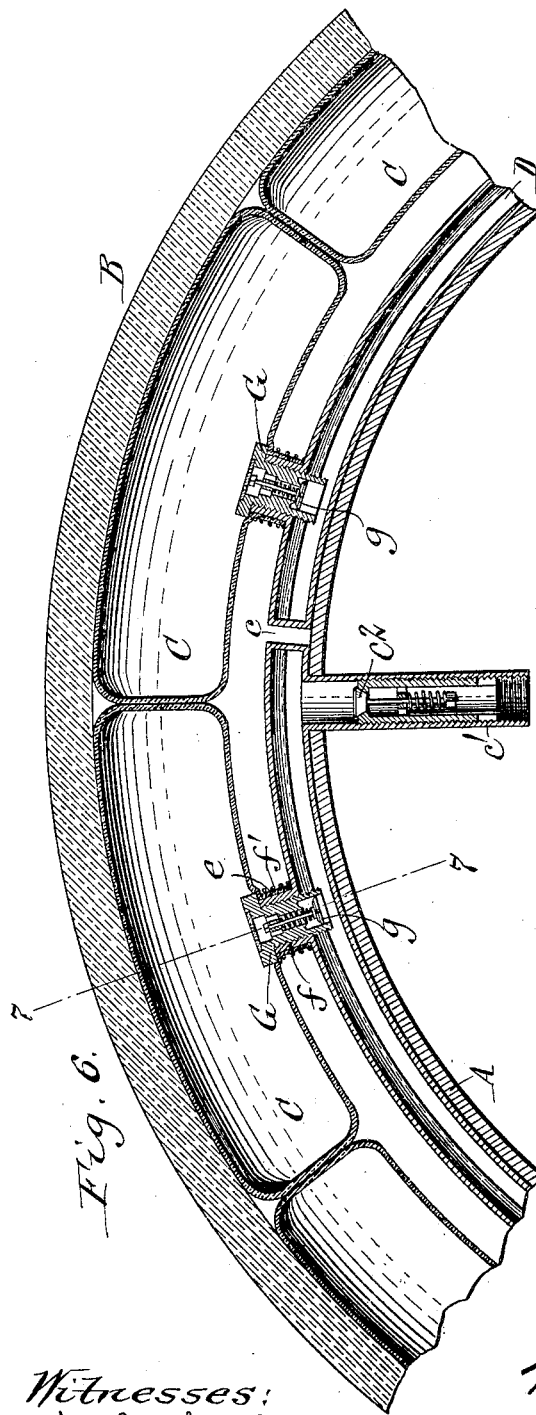
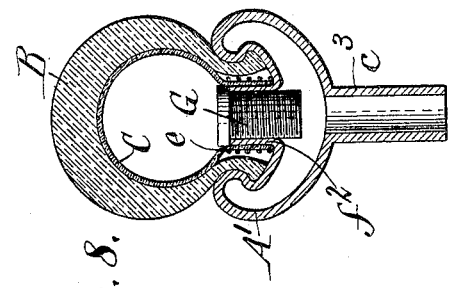
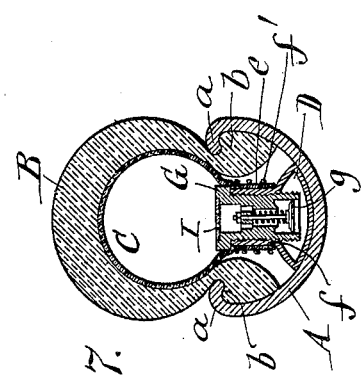

UNITED STATES PATENT OFFICE.

MANLEY H. BLAKESLEE, OF BUFFALO, NEW YORK, ASSIGNOR OF ONE-HALF TO ROSCOE D. BAKER, OF BUFFALO, NEW YORK.

PNEUMATIC TIRE.

No. 804,088.     Specification of Letters Patent.     Patented Nov. 7, 1905.

Application filed December 1, 1904. Serial No. 235,068.

*To all whom it may concern:*

Be it known that I, MANLEY H. BLAKESLEE, a citizen of the United States, residing at Buffalo, in the county of Erie and State of New York, have invented new and useful Improvements in Pneumatic Tires, of which the following is a specification.

This invention relates to pneumatic tires of that class comprising a main tube or shoe which contains an annular series of separable inflatable sections, cells, or chambers and an air-supply tube or conduit communicating with all of the sections.

The object of my invention is to provide a tire of this kind which possesses practically the high degree of resilience of an ordinary pneumatic tire and which at the same time is so constructed that in the event of a section being punctured the same will be automatically cut off from the remaining intact sections, thus keeping the tire in serviceable condition until its punctured section can be conveniently repaired.

In the accompanying drawings, consisting of two sheets, Figure 1 is a sectional elevation of a tire embodying my invention. Fig. 2 is a fragmentary longitudinal section of the supply-tube and one of the check-valves on an enlarged scale. Fig. 3 is a cross-section in line 3 3, Fig. 2. Figs. 4 and 5 are top and bottom plan views of the valve, respectively. Fig. 6 is a fragmentary longitudinal section, on an enlarged scale, of the tire, taken centrally through the inflatable sections. Fig. 7 is a cross-section in line 7 7, Fig. 6. Fig. 8 is a similar section of a modified construction of the tire.

Similar letters of reference indicate corresponding parts throughout the several views.

A indicates the usual grooved wheel-rim, which may be of sheet metal and provided at its edges with the customary hook-shaped flanges $a$.

B indicates the shoe or outer tube of the tire, which in the construction shown in the drawings is provided with marginal shoulders $b$, which interlock with the flanges of the rim in any well-known manner. The rim and the outer tube may, however, be of any other suitable construction, and in some cases the outer tube may be omitted, if desired.

C indicates the inflatable sections or chambers arranged in a circular row within the shoe B, with the ends of adjoining sections located in close proximity to each other, as shown in Figs. 1 and 6. These hollow sections are cylindrical, or approximately so, and preferably constructed of thin soft rubber. They bear at their outer sides against the inner side of the shoe B and are curved to conform thereto.

D indicates the circular air-supply tube or conduit of the inflatable sections C, which lies between the sections and the concave face of the wheel-rim and which may be constructed of metal or other suitable material. This tube is preferably oval or lenticular in cross-section, so as to fit the wheel-rim, as shown in Fig. 7, and it is split, as shown at $c$, to permit its being sprung over the rim. The tube is provided with an inlet-nozzle $c'$, having the usual check-valve $c^2$.

Each of the inflatable sections C communicates with the supply-tube by means of an inlet-passage consisting, preferably, of a nipple $e$, projecting from its inner side and embracing a similar nipple $f$, which projects outwardly from the tube, a tight joint being obtained by winding wire $f'$ around the telescoped nipples or by any other suitable means.

Each section C is provided with an automatic or check valve $g$, the casing G of which is secured in the corresponding tube-nipple $f$ and extends through the same, the open ends of the case communicating, respectively, with the supply-tube and the inflatable section, as shown in Figs. 6 and 7. This check-valve is adapted to close against a seat $h$, arranged near the inner end of its case, so as to close outwardly or in direction in which the air enters the section. Each of these valves is normally held open by a comparatively light spring $h'$, applied to its stem, so that upon forcing air into and through the supply-tube B all of the sections will be inflated simultaneously and with a uniform pressure.

Should a section become punctured, the sudden rush of air from the intact sections toward the punctured one causes the check-valve of the latter to be instantly closed, thus practically preventing the escape of air except from the punctured sections. The springs $h'$ are made sufficiently light to permit the closing of the valves by the air-pressure in case of a puncture and yet offer sufficient resistance to prevent their closing in inflating the tire.

For the purpose of causing the check-valve of the punctured section to seat promptly this valve is constructed to fit quite close in the lower or inner part of the valve-casing, so that the same forms practically a piston against which the compressed air operates for closing the valve. While filling the tire slowly with air during the ordinary inflating operation the air passes from the supply-tube D, through notches $h^2$ in the edges of the check-valves, into the inflatable sections without shifting the check-valves.

In order to cause the valve to seat securely and form an air-tight joint, the face of the same is provided with a packing or washer $g'$, of rubber, and the valve-seat $h$ is constructed in the form of an annular rib, which is comparatively sharp, so that the rubber packing $g'$ upon engaging the same is indented and effectually prevents the passage of air.

When one of the sections is collapsed, the remaining sections have a tendency to elongate and fill up the space produced by the collapsing of the punctured section. In order to avoid undue straining of the unpunctured sections when this occurs, each of the sections is made somewhat larger than is necessary to fill the inflating-space within the shoe. By this means the sections are practically free from any strain, while all the inflatable sections are intact, and a sufficient slack or surplus in the several sections is provided to permit the same to shift or stretch circumferentially for closing up the gap caused by the puncturing of a section without liability of stretching adjacent sections to such an extent as would be liable to burst them.

To prevent injury to the check-valves of the sections when the tire is used in a collapsed or deflated condition, the casings of the valves are made of such a length that their outer ends do not extend beyond the rim-flanges $a$, or, in other words, the flanges of the wheel-rim extend beyond the outer ends of the valves, as shown in Fig. 7. To further protect these valves, a guard or plate I is preferably applied to the outer end of each valve-casing, this guard preventing the collapsed section and the shoe when resting on the ground from pressing against the valve-stem and opening the valve. The guard is provided with one or more air-passages $i$.

It will be observed that when the tire is inflated all of the sections C are in free communication with the supply-tube, which latter forms a connecting-conduit between the sections, thus rendering the tire practically as resilient as an ordinary non-sectional tire and subjecting the individual sections to less strain than in a tire in which there is no such communication between the sections in the normal condition of the tire. For the same reason the tire can be deflated like an ordinary pneumatic tire by simply unseating the check-valve of the supply-tube.

In the modified construction shown in Fig. 8 the rim A' is made hollow or in the form of a closed tube and utilized as the supply-tube for the several inflatable sections instead of employing a separate tube for this purpose. In this case the hollow rim has the main inlet-valve $c^3$. It is also provided in its grooved side with nipples $f^2$, which fit into the supply-nipples of the inflatable sections.

I claim as my invention—

1. A pneumatic tire having a series of inflatable sections or chambers, a common air-supply conduit communicating with all of the sections by individual passages, and a plurality of automatic valves each controlling one of said passages and operating to permit free communication between the sections and the supply-conduit in the normal inflated condition of the sections and to cut off communication between the conduit and the sections when one or more of the same become deflated by puncturing, substantially as set forth.

2. A pneumatic tire having an annular series of inflatable sections or chambers arranged end to end, a common air-supply conduit for said sections extending along their inner sides and connected therewith by individual passages, and a plurality of automatic valves each controlling one of said passages and operating to permit free communication between all of the sections and the supply-conduit in the normal inflated condition of the sections and to cut off communication between the conduit and the sections when one or more of the same become deflated by puncturing, substantially as set forth.

3. A pneumatic tire having a series of inflatable sections or chambers, a common air-supply conduit communicating with all of the sections by individual passages, valves controlling said passages and arranged to close in the direction in which the air enters the sections, and means for yieldingly holding the valves open against the pressure of the incoming air in inflating the tire, substantially as set forth.

4. A pneumatic tire having a series of inflatable sections or chambers, a common air-supply conduit communicating with all of the sections by individual passages, a check-valve arranged in each of said passages and closing toward the corresponding section, and a spring for each check-valve constructed and arranged to hold the valve open in inflating the sections while permitting the same to be closed by the air-pressure in the supply-conduit when the corresponding section becomes punctured, substantially as set forth.

5. The combination with a pneumatic tire having a series of inflatable sections or chambers, a supply-conduit communicating with the sections by individual passages and automatic valves arranged in said passages, of a grooved wheel-rim having its lateral edges arranged beyond the outer ends of said valves, substantially as set forth.

6. A pneumatic tire having a series of inflatable sections or chambers, a common air-supply conduit communicating with all of the sections by individual passages, valve-casings arranged in said passages and containing check-valves which close toward the sections, and perforated guards applied to the outer ends of the casings, substantially as set forth.

Witness my hand this 22d day of November, 1904.

MANLEY H. BLAKESLEE.

Witnesses:
THEO. L. POPP,
ROSCOE D. BAKER.